US012398591B1

(12) United States Patent
Vanderwoude

(10) Patent No.: US 12,398,591 B1
(45) Date of Patent: Aug. 26, 2025

(54) ONE PIECE FLOOD PANEL BARRIER FOR RESIDENTIAL AND COMMERCIAL STRUCTURES

(71) Applicant: Gerbrig Vanderwoude, N Ft Meyers, FL (US)

(72) Inventor: Gerbrig Vanderwoude, N Ft Meyers, FL (US)

(*) Notice: Subject to any disclaimer, the term of this patent is extended or adjusted under 35 U.S.C. 154(b) by 0 days.

(21) Appl. No.: 19/220,403

(22) Filed: May 28, 2025

(51) Int. Cl.
*E06B 9/00* (2006.01)

(52) U.S. Cl.
CPC .......... *E06B 9/00* (2013.01); *E06B 2009/007* (2013.01)

(58) Field of Classification Search
CPC ........ E06B 9/00; E06B 2009/007; E06B 9/02; E06B 2009/005; E02D 31/002; E02D 31/004; E02D 31/006
USPC ...................................... 52/169.14, 202, 203
See application file for complete search history.

(56) References Cited

U.S. PATENT DOCUMENTS 7,270,498 B1 * 9/2007 Albanese .................. E06B 9/04 52/302.1
7,523,589 B1 * 4/2009 Smith ....................... E06B 9/02 49/63
7,730,932 B1 * 6/2010 Bauer ....................... E06B 9/00 160/369
8,308,396 B2 * 11/2012 Shook ................... E04B 1/7076 52/169.5
8,375,664 B2 * 2/2013 Gower, Sr. ............ E04B 1/7076 52/302.1
8,869,455 B1 * 10/2014 McFall ..................... E06B 9/02 52/208
8,991,119 B1 * 3/2015 Bracci ....................... E06B 9/02 52/203
9,637,912 B1 * 5/2017 Anderson, Jr. ....... E04B 1/7076
2004/0250477 A1 * 12/2004 Butcher .................... E06B 9/02 52/3
2006/0086057 A1 * 4/2006 Rasenberger ............. E06B 9/02 52/202
2008/0034671 A1 * 2/2008 Harrington ............... E06B 9/00 52/2.25
2008/0169070 A1 * 7/2008 Mullet .................. E06B 9/0692 160/369

(Continued)

*Primary Examiner* — Brian E Glessner
*Assistant Examiner* — Adam G Barlow
(74) *Attorney, Agent, or Firm* — GULF COAST INTELLECTUAL PROPERTY GROUP

(57) ABSTRACT

A one-piece custom panel that is configured to be releasably secured to a building over an opening thereto so as to inhibit flood waters from entering the building. The invention includes a panel member manufactured from a rigid lightweight material. The panel member has secured thereto a support assembly wherein the support assembly is secured to all four perimeter edges of the panel member. The support assembly surroundably mounts the perimeter edges of the panel member having portions on the front side and rear side of the panel member. A cable member is operably coupled across the panel member and the opposing lateral support members. A water removal member is operably installed in a lower support member and is configured to remove water accumulation. A sealing member is present on the lower support member and lateral support members. Corner brace members are superposed each corner of the flood barrier.

12 Claims, 3 Drawing Sheets

(56) References Cited

U.S. PATENT DOCUMENTS

| | | | | |
|---|---|---|---|---|
| 2011/0182669 | A1* | 7/2011 | Shook | E04B 1/7076 405/104 |
| 2017/0167132 | A1* | 6/2017 | Anderson, Jr. | E06B 9/00 |
| 2017/0321445 | A1* | 11/2017 | Anderson, Jr. | E04B 1/92 |
| 2019/0017315 | A1* | 1/2019 | Barresi | E04H 9/145 |
| 2020/0199903 | A1* | 6/2020 | Anderson, Jr. | E04H 9/145 |

* cited by examiner

ONE PIECE FLOOD PANEL BARRIER FOR RESIDENTIAL AND COMMERCIAL STRUCTURES

FIELD OF THE INVENTION

The present invention relates generally to damage prevention devices, more specifically but not by way of limitation, a flood barrier configured to be releasably secured over entry points into a home such as but not limited to a doorway wherein the flood barrier of the present invention includes a panel member having support members operably coupled to lateral and lower edges thereof.

BACKGROUND

In recent years, the frequency and severity of flood events have increased significantly across the United States, particularly in coastal states such as Florida. Driven by climate change, rising sea levels, and increasingly erratic weather patterns, flooding has become not only more common but also more destructive. Homeowners face the dual burden of repeated property damage and the financial strain of preparing for or recovering from these disasters. In this context, the need for effective yet affordable flood mitigation solutions has never been more urgent. Among the most promising responses to this crisis is the development of low-cost, custom-made flood barriers designed to protect vulnerable entry points such as doors and windows. Florida, with its extensive coastline and flat topography, is especially vulnerable to flooding from hurricanes, tropical storms, and even heavy seasonal rains. Cities like Miami, Tampa, and Jacksonville frequently experience flooding that results in significant property damage, displaces families, and strains emergency services. According to data from the Federal Emergency Management Agency, flood damage is one of the most common and costly natural disasters in the United States, with billions of dollars in property losses reported annually. Homeowners are often left to absorb much of this cost, either through expensive insurance premiums or out-of-pocket repairs, particularly if they live outside designated flood zones where mandatory coverage is not required.

Traditional flood prevention measures such as sandbags, permanent barriers, or complex drainage systems are often expensive, difficult to install, and inadequate in the face of rising waters. For the average homeowner, these solutions are either financially unattainable or practically unfeasible. Furthermore, while federal and state programs may offer some assistance, such aid is often delayed, limited in scope, and insufficient to meet the growing need. Consequently, many residents are left without a reliable means of protecting their homes, leading to repeated damage and mounting financial insecurity. In this challenging landscape, affordable, custom-made flood barriers present a highly beneficial alternative. These custom made one-piece barriers are designed to fit precisely over doors and windows, the most common entry points for floodwaters, creating a watertight seal that prevents interior flooding. Unlike traditional methods, these barriers can be quickly deployed and easily stored, making them ideal for residential use. Because they can be tailored to the specific dimensions and architecture of each home, they offer a level of protection that is both effective and personalized.

The benefits of such an innovation are manifold. First, it democratizes access to flood protection, allowing even low- and middle-income homeowners to safeguard their properties without incurring significant costs. Second, it reduces the long-term financial burden associated with repeated flood damage, including repair costs, insurance claims, and property devaluation. Third, by enabling homeowners to take proactive steps toward flood mitigation, it fosters a sense of empowerment and resilience within at-risk communities. Moreover, the widespread adoption of low-cost flood barriers could have broader societal impacts. Reducing the extent of flood damage across neighborhoods can help stabilize local economies, maintain property values, and decrease the financial strain on insurance companies and government aid programs. It also aligns with the broader goals of climate adaptation by encouraging practical, scalable solutions that can be implemented at the individual level.

The increasing incidence of flood damage, especially in vulnerable areas like Florida, highlights the urgent need for accessible and affordable protective measures. Custom-made flood barriers for doors and windows represent a practical, cost-effective solution that can significantly mitigate the risks faced by homeowners. By investing in and promoting the adoption of such innovations, society can take a meaningful step toward reducing the impact of flooding and building more resilient communities.

Accordingly, there is a need for a flood barrier that is configured to be releasably secured over an entry point into a house wherein the present invention is provided in custom sizes and is further configured to provide removal of water that may accumulate between the flood panel barrier and the structure.

SUMMARY OF THE INVENTION

It is the object of the present invention to provide a flood barrier that is provided in custom sizes to extend across various entry points into a structure such as but not limited to a home wherein the present invention includes a custom one-piece panel member manufactured from a rigid lightweight material.

Another object of the present invention is to provide a flood barrier that is configured to be releasably secured over doorways and other points of entry into a home so as to prevent flood waters from entering thereinto wherein the panel member includes opposing lateral edges, a lower edge and an upper edge.

A further object of the present invention is to provide a flood barrier that is provided in custom sizes to extend across various entry points into a structure such as but not limited to a home wherein the panel member has operably coupled thereto support members, wherein the support members are secured to the opposing lateral edges, lower edge and upper edge of the panel member.

Yet a further object of the present invention is to provide a flood barrier that is configured to be releasably secured over doorways and other points of entry into a home so as to prevent flood waters from entering thereinto wherein the present invention further includes a sealing member, wherein the sealing member is disposed on the second side of the support members proximate an edge thereof.

Still another object of the present invention is to provide a flood barrier that is provided in custom sizes to extend across various entry points into a structure such as but not limited to a home wherein the present invention further includes at least one cable member that is operably coupled intermediate the support members secured to the opposing lateral edges of the panel member.

An additional object of the present invention is to provide a flood barrier that is configured to be releasably secured over doorways and other points of entry into a home so as to prevent flood waters from entering thereinto wherein the present invention further includes a water removal member, wherein the water removal member is proximate the lower edge of the panel member.

Yet a further object of the present invention is to provide a flood barrier that is provided in custom sizes to extend across various entry points into a structure such as but not limited to a home wherein the water removal member includes an opening having a cover member superposed thereto.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
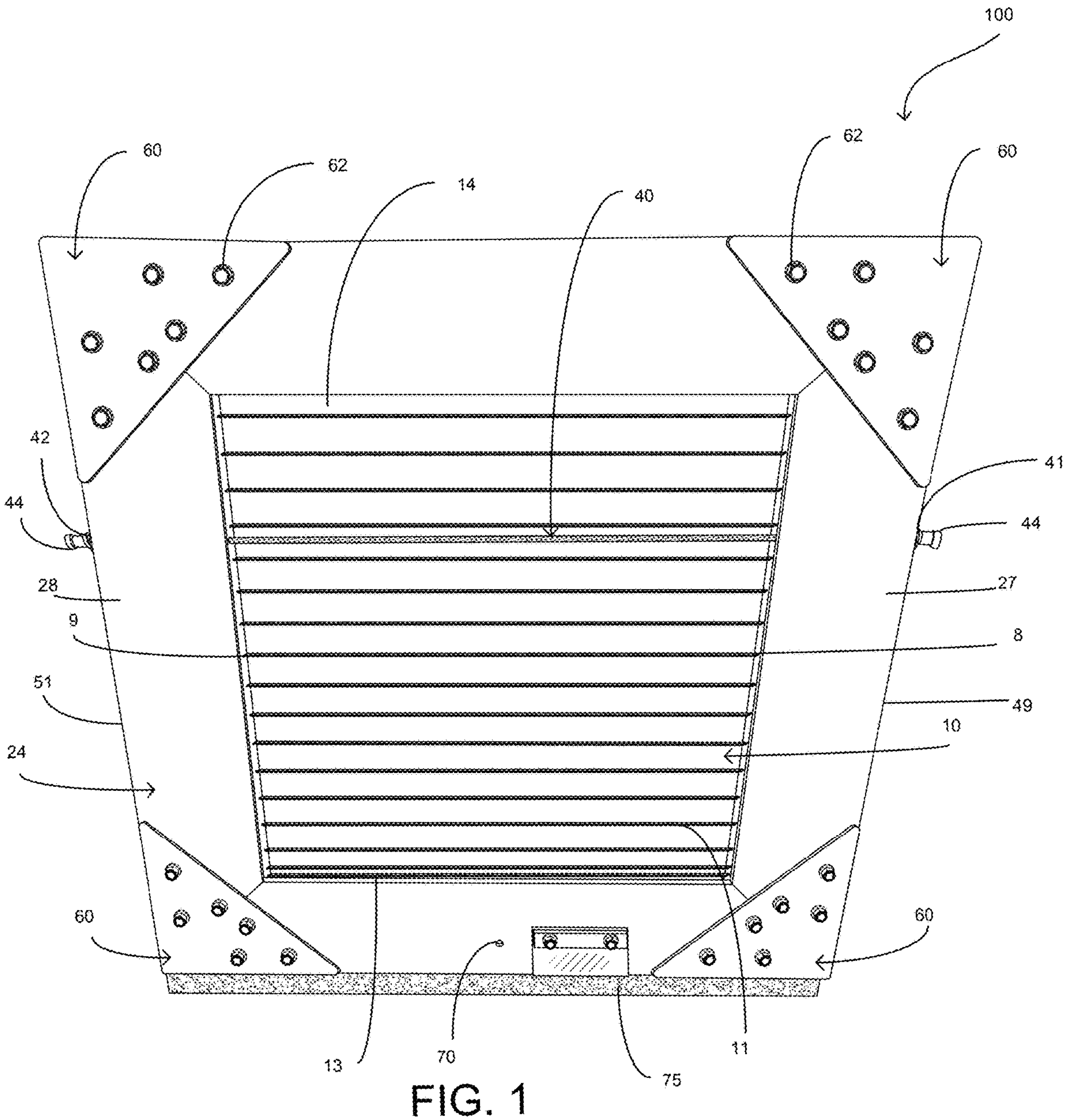
FIG. 1 is a front view of a preferred embodiment of the present invention.

Referring now to the drawings submitted herewith, wherein various elements depicted therein are not necessarily drawn to scale and wherein through the views and figures like elements are referenced with identical reference numerals, there is illustrated a flood barrier 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms “a”, “an” and “the” include the plural reference unless the context clearly dictates otherwise. Thus, for example, a reference to “an element” is a reference to one or more elements and includes equivalents thereof known to those skilled in the art. All conjunctions used are to be understood in the most inclusive sense possible. Thus, the word “or” should be understood as having the definition of a logical “or” rather than that of a logical “exclusive or” unless the context clearly necessitates otherwise. Structures described herein are to be understood also to refer to functional equivalents of such structures. Language that may be construed to express approximation should be so understood unless the context clearly dictates otherwise.

References to “one embodiment”, “an embodiment”, “exemplary embodiments”, and the like may indicate that the embodiment(s) of the invention so described may include a particular feature, structure or characteristic, but not every embodiment necessarily includes the particular feature, structure or characteristic.

Referring in particular to the Figures submitted herewith, the flood barrier 100 is configured to be releasably secured to a structure and in particular over an opening such as but not limited to a doorway. It should be understood within the scope of the present invention that the flood barrier 100 can be provided in alternate sizes wherein the width and height thereof can vary to be adapted to cover a desired opening in a structure such as but not limited to a doorway or window.

The flood barrier 100 includes a panel member 10 wherein the panel member 10 is manufactured from a lightweight rigid material. In a preferred embodiment the panel member 10 is manufactured from a polycarbonate material wherein the material includes a first layer, a second layer and a honeycomb support structure intermediate the first layer and second layer. It is further contemplated within the scope of the present invention that he panel member 10 could be constructed from alternate materials such as but not limited to aluminum and have a structure that is capable of withstanding the pressure of the water on the front side 11 of the panel member. The panel member 10 includes opposing lateral edges 8,9, lower edge 13 and upper edge 14.

Secured to the panel member 10 is a support member assembly 20. The support member assembly 20 is manufactured from a durable rigid material such as but not limited to aluminum and surroundably mount the panel member 10 having a portion thereof adjacent the front side 11 and rear side 12 of the panel member 10. The support member assembly 20 is secured completely around the perimeter of the panel member 10 and is operably coupled thereto utilizing suitable durable techniques. The support member assembly includes a front side 24 and rear side 26. Support member assembly 20 comprises a pair of lateral support members 27,28, a lower support member 29 and an upper support member 30. The support member assembly 20 in a preferred embodiment is manufactured from aluminum u-channel material that provides an ability to surroundably mount the edge portions of the panel member 10 while being adjacent both the front side 11 and rear side 12 of the panel member 10. The aforementioned provides a more durable operable coupling that is capable of withstanding the ponds per square inch pressure of flood water against the flood barrier 100.

Operably coupled intermediate the lateral support members 27,28 is the cable member 40. Cable member 40 is a stainless steel cable having a first end 41 and a second end 42. First end 41 of the cable member 40 extends beyond the outer edge 49 of lateral support member 27. Second end 42 is journaled through the lateral support member 28 and extends beyond outer edge 51. The first end 41 and second end 42 have fasteners 44 operably coupled thereto. Fasteners 44 are mechanical couplers that facilitate the increase in tension of the cable member 40. Ensuing installation of the cable member 40 fasteners 44 are manipulated so as to increase the tension of the cable member 40 which increase the structural rigidity of the flood barrier 100. While only one cable member 40 is illustrated herein, it should be understood within the scope of the present invention that the flood barrier 100 could have installed thereon more than one cable member 40.

The support member assembly 20 includes corner brace members 60 secured thereto in each corner thereof. The corner brace members 60 are triangular in shape configured to mateably superpose each corner of the support member assembly 20. The corner brace members 60 are manufactured from a rigid planar material such as but not limited to metal sheet. Fasteners 62 are utilized to mechanically couple the corner brace members 60 to the support member assembly 20. It should be further understood within the scope of the present invention that at least one of the fasteners 62 extend through the corner brace member 60 and support member assembly 20 having sufficient length to secure into the building to which the flood barrier 100 is being mounted. Aperture 70 is provided to facilitate receipt of a mechanical coupling device such as but not limited to a bolt or screw in order to facilitate releasably securing of the flood barrier 100 to a building. It should be understood within the scope of the present invention that the support member assembly 20 could have a plurality of apertures 70 dispersed along the support member assembly 20.

Lower support member 29 has operably coupled thereto lower sealing member 75. Lower sealing member 75 is secured to the lower support member 29 utilizing suitable durable techniques such as but not limited to chemical adhesion. The lower sealing member 75 extends the length of the lower support member 29 and inhibits water from egressing therepast. The lower sealing member 75 is manufactured from a durable suitable material such as but not limited to rubber. Lateral sealing members 78,79 are contiguous with the lower sealing member 75 being perpendicular thereto extending upward along lateral support members 27,28 proximate outer edges 49, 51. The lateral sealing members 78 are made of the same material as the lower sealing member 75 and function to inhibit water from egressing therepast.

Figure 2:
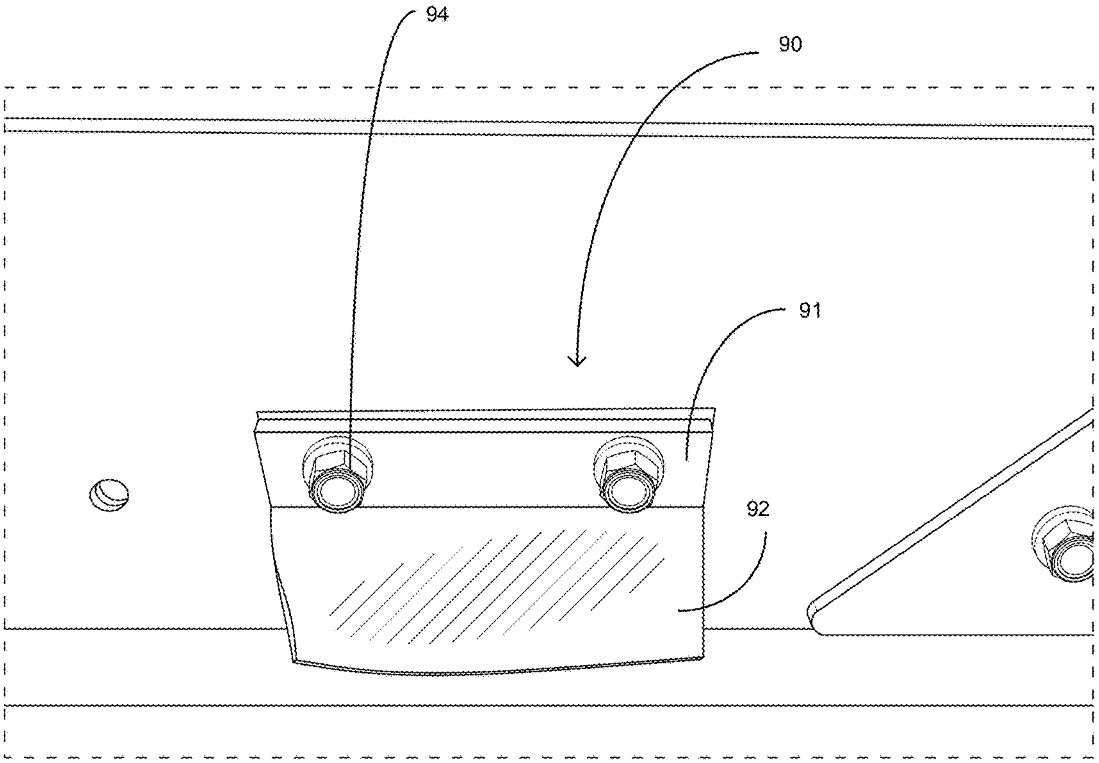
FIG. 2 is a detailed view of the water removal member in a closed position.
Figure 3:
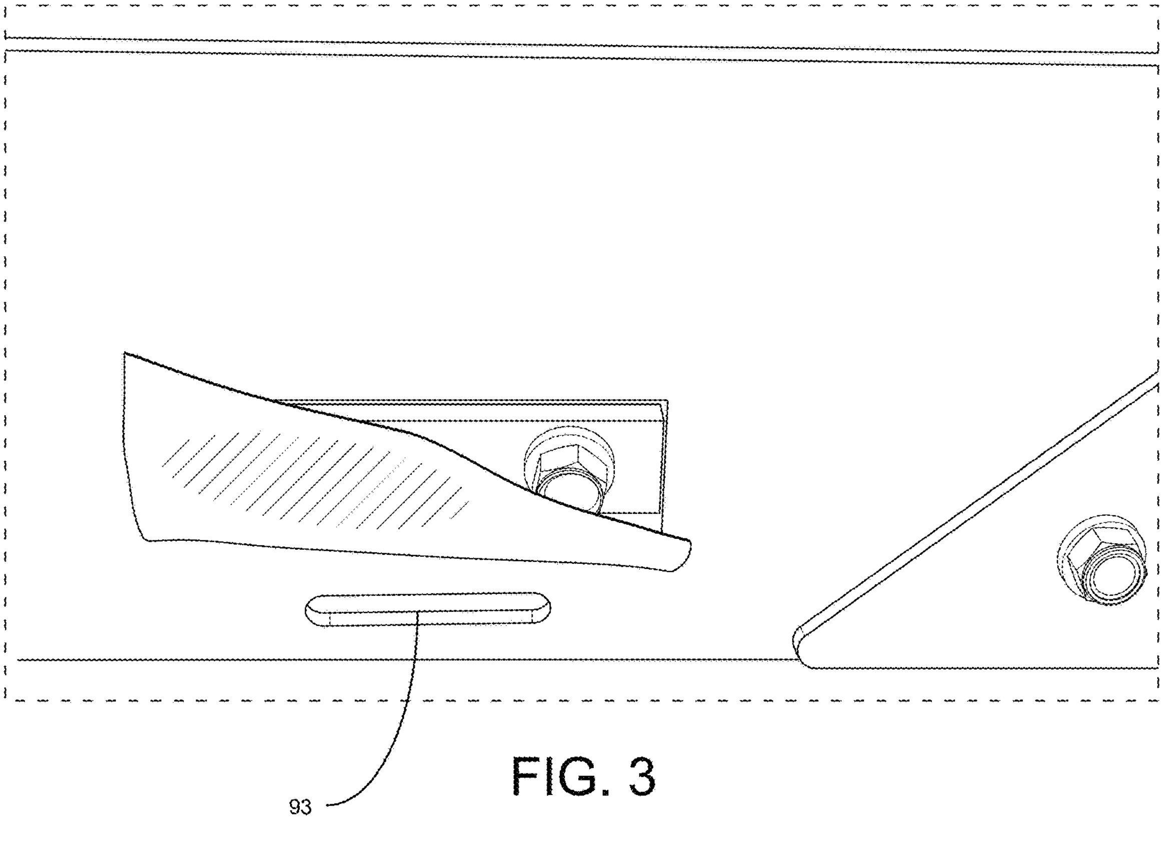
FIG. 3 is a is a detailed view of the water removal member in an open position.
Figure 4:
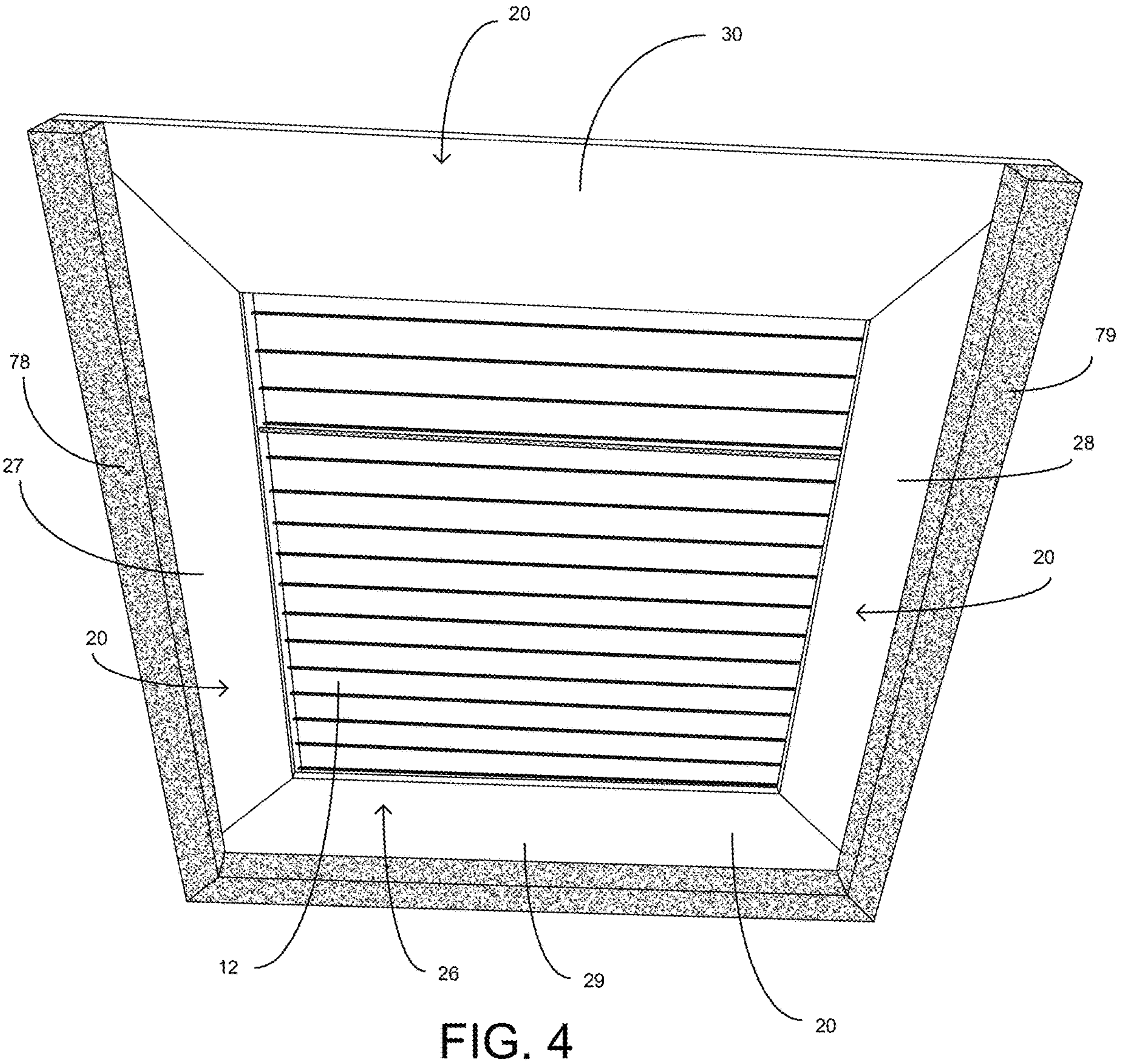
FIG. 4 is a rear view of a preferred embodiment of the present invention.

Referring in particular to FIG. 2 and FIG. 3 submitted as a part hereof, the flood barrier 100 further includes water removal member 90. The water removal member 90 is operable to facilitate removal of any water accumulating between the flood barrier 100 and the structure to which the flood barrier 100 is secured. Rain and the like can potentially enter the void between the flood barrier 100 and the building to which the flood barrier 100 is secured as flood barriers 100 could be installed for months at a time on vacant buildings during seasons such as but not limited to hurricane season. The water removal member 90 is located on the lower support member 29. An opening 93 is formed in the lower support member 29 and is oval in shape. Opening 93 permits water to pass therethrough. A cover member 92 manufactured from a pliable material such as but not limited to rubber is secured over the opening 93. Cover member 92 is movable between a first position and a second position. In its first position, illustrated herein in FIG. 2, the cover member 92 is superposed the opening 93 inhibiting water from egressing past the flood barrier 100. Pressure from flood waters and the like maintain the cover member 92 in its first position and as such seals the opening 93. During presence of water accumulation between the flood barrier 100 and the structure to which the flood barrier 100 is releasably secured, the cover member 92 is moved to its second position as the pressure from the rear side of the flood barrier 100 forces the water through the opening 93 moving cover member 92 to its second position allowing water to flow therethrough. The cover member 92 is secured in position with plate member 91 having fasteners 94. Plate member 91 is manufactured from metal or other similar rigid material along the upper edge of the cover member 92 and permits movement of the cover member 92 as described herein. While a particular embodiment of the water removal member 90 is illustrated and discussed herein, it is contemplated within the scope of the present invention that the water removal member 90 could be constructed in alternate manners and with different elements. By way of example but not limitation, the water removal member 90 could be constructed from a one-way check valve. Additionally, it should be understood within the scope of the present invention that the flood barrier 100 could have more than one water removal member 90.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. Itis to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A flood barrier configured to be releasably secured to a structure over a portion of an opening thereof wherein the flood barrier comprises:

a one-piece panel member, said panel member having a front side and a rear side, said panel member having a lower end and an upper end, said panel member having opposing lateral edges, said panel member being manufactured from a rigid material, said panel member having perimeter edges defining a shape thereof;

a support member assembly, said support member assembly being operably coupled to said panel member proximate said perimeter edges thereof, said support member assembly consisting of a lower support member, an upper support member and a first lateral support member and a second later support member, said first lateral support member and said second lateral support member being operably coupled to the opposing lateral edges of said panel member, said first lateral support member being parallel with said second lateral support member, said lower support member being mounted to said panel member proximate said lower end thereof, said lower support member being operably coupled to said first lateral support member and said second lateral support member being perpendicular therewith, said upper support member being mounted to said panel member proximate said upper end of said panel member, said upper support member being operably coupled to said first lateral support member and said second lateral support member being perpendicular therewith, said lower support member, upper support member, first lateral support member and said second later support member being contiguous;

a lower seal member, said lower seal member being mounted to a bottom edge of said lower support member;

a first lateral sealing member and a second lateral sealing member, said first lateral sealing member being secured to said first lateral support member on a rear side thereof, said second lateral sealing member being secured to said second lateral support member on a rear side thereof, said first lateral sealing member and said second lateral sealing member being contiguous with said lower seal member and perpendicular thereto; and at least one cable member, said at least one cable member being operably coupled to said first lateral support member and said second lateral support member, said at least one cable member having a first end and a second end.

2. The flood barrier configured to be releasably secured to a structure over a portion of an opening thereof as recited in claim 1, and further including a water removal member, said water removal member being operably mounted in said lower support member of said support member assembly, said water removal member configured to facilitate removal of water present intermediate the panel member and the structure.

3. The flood barrier configured to be releasably secured to a structure over a portion of an opening thereof as recited in claim 2, and further including four corner brace members, said four corner brace members being mateably mounted to four corners of the support member assembly, said four corner brace members being planar in manner and adjacent a front side of the support member assembly.

4. The flood barrier configured to be releasably secured to a structure over a portion of an opening thereof as recited in claim 3, wherein said water removal member includes an opening, said opening being journaled through said lower support member.

5. The flood barrier configured to be releasably secured to a structure over a portion of an opening thereof as recited in claim 4, wherein said water removal member includes a cover member, said cover member having a first position and a second position, said cover member having an upper edge and a lower edge.

6. The flood barrier configured to be releasably secured to a structure over a portion of an opening thereof as recited in claim 5, wherein said upper edge of said cover member is secured to said lower support member with a plate member, said plate member having the upper edge of said cover member biased between said plate member and an exterior surface of said lower support member.

7. The flood barrier configured to be releasably secured to a structure over a portion of an opening thereof as recited in claim 6, wherein in said first position said cover member is adjacent said exterior surface of said lower support member providing coverage of said opening of said water removal member.

8. The flood barrier configured to be releasably secured to a structure over a portion of an opening thereof as recited in claim 7, wherein in said second position said cover member is moved away from said opening of said water removal member so as to allow water to flow therethrough.

9. The flood barrier configured to be releasably secured to a structure over a portion of an opening thereof as recited in claim 8, wherein said support member assembly surroundably mounts said panel member.

10. The flood barrier configured to be releasably secured to a structure over a portion of an opening thereof as recited in claim 9, wherein said first end of said cable member extends beyond an outer edge of said first lateral support member and wherein said second end of said cable member extends beyond an outer edge of said second lateral support member.

11. The flood barrier configured to be releasably secured to a structure over a portion of an opening thereof as recited in claim 10, and further including a first fastener and a second fastener, said first fastener being operably coupled to said first end of said at least one cable member, said second fastener being operably coupled to said second end of said at least one cable member.

12. The flood barrier configured to be releasably secured to a structure over a portion of an opening thereof as recited in claim 11, wherein said first fastener and said second fastener are movable to increase tension on said at least one cable member.

* * * * *